United States Patent
Pancke et al.

(10) Patent No.: US 6,697,243 B1
(45) Date of Patent: Feb. 24, 2004

(54) UNDER VOLTAGE RELEASE WITH AN ELECTROMAGNET AND CLOCKED HOLDING CURRENT CIRCUIT

(75) Inventors: Andreas Pancke, Berlin (DE); Hans Rehaag, Zepernick (DE); Wolfgang Roehl, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/089,305

(22) PCT Filed: Sep. 27, 2000

(86) PCT No.: PCT/DE00/03435

§ 371 (c)(1),
(2), (4) Date: Mar. 29, 2002

(87) PCT Pub. No.: WO01/26200

PCT Pub. Date: Apr. 12, 2001

(30) Foreign Application Priority Data

Sep. 30, 1999  (DE) .......................... 199 48 696

(51) Int. Cl.⁷ .............................................. H01H 47/28
(52) U.S. Cl. ...................... 361/92; 361/115; 361/153; 361/187
(58) Field of Search ............................. 361/90, 92, 115, 361/152, 153, 160, 187

(56) References Cited

U.S. PATENT DOCUMENTS

| | | | | |
|---|---|---|---|---|
| 4,205,361 A | * | 5/1980 | Shimp | 361/92 |
| 4,584,623 A | * | 4/1986 | Bello et al. | 361/187 |
| 4,706,158 A | * | 11/1987 | Todaro et al. | 361/92 |
| 4,788,621 A | | 11/1988 | Russell | 361/115 |
| 4,833,563 A | * | 5/1989 | Russell | 361/92 |
| 4,890,184 A | | 12/1989 | Russell | 361/87 |

FOREIGN PATENT DOCUMENTS

| | | | | |
|---|---|---|---|---|
| DE | 195 07 936 | | 9/1996 | ............ H02H/3/24 |
| EP | 0 203 366 | | 12/1986 | .......... H01H/47/32 |

* cited by examiner

Primary Examiner—Jeffrey Sterrett
(74) Attorney, Agent, or Firm—Harness, Dickey & Pierce, P.L.C.

(57) ABSTRACT

In order to provide as short a switching delay as possible in an undervoltage release which contains an electromagnet for tripping a switching device, and a driver circuit feeding the winding of the electromagnet, with the driver circuit being used to produce a pulsed holding current for the electromagnet, an electronic switch is fitted in the self-holding circuit that is produced via a freewheeling diode. This electronic switch can be driven as a function of the output signal from an undervoltage detector which is arranged within the driver circuit.

5 Claims, 1 Drawing Sheet

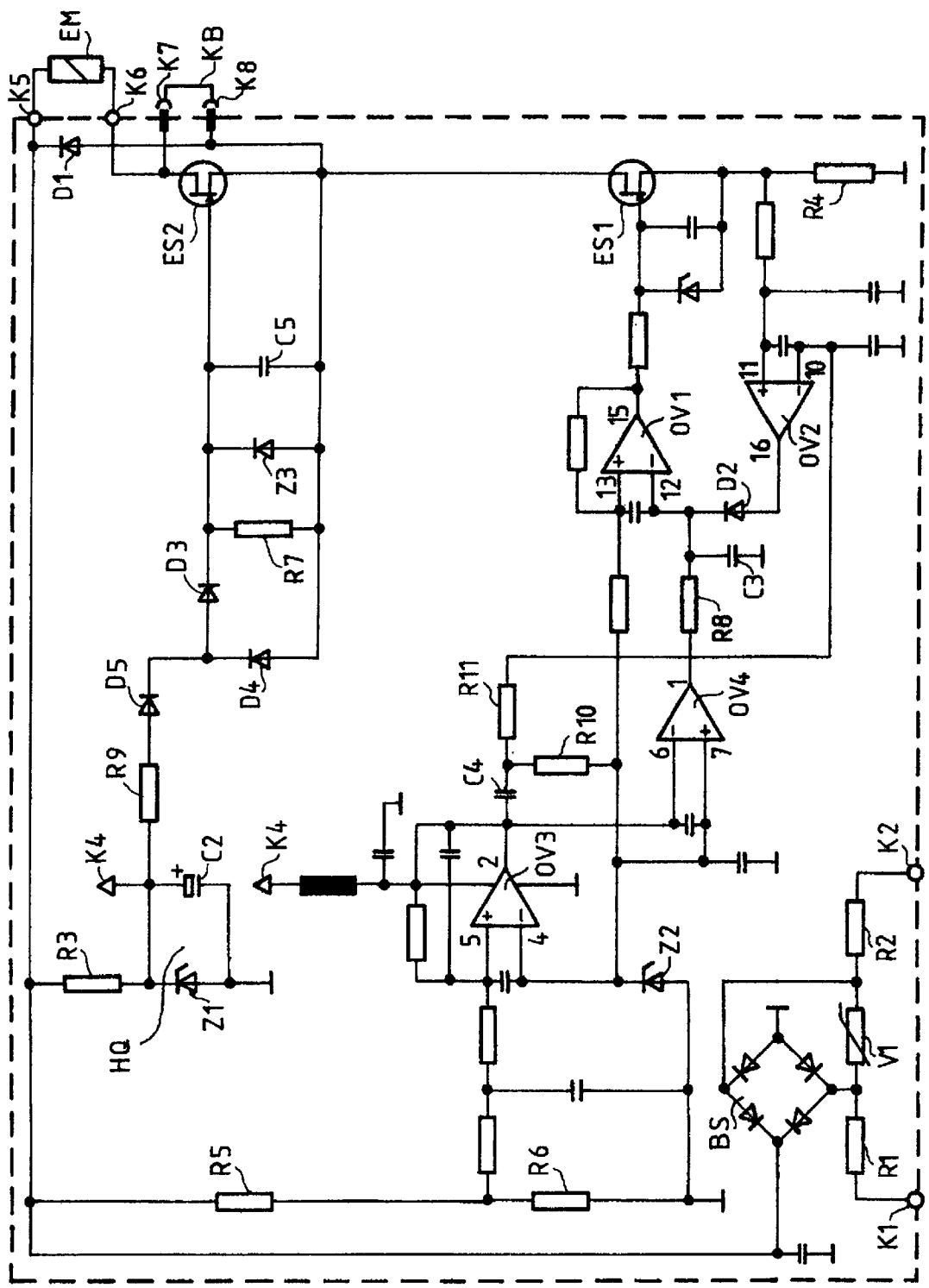

US 6,697,243 B1

UNDER VOLTAGE RELEASE WITH AN ELECTROMAGNET AND CLOCKED HOLDING CURRENT CIRCUIT

This application is the national phase under 35 U.S.C. §371 of PCT International Application No. PCT/DE00/03435 which has an International filing date of Sep. 27, 2000, which designated the United States of America, the entire contents of which are hereby incorporated by reference.

FIELD OF THE INVENTION

The invention generally relates to the field of protection technology for single-phase or polyphase low-voltage power supply systems. In one embodiment, it can be applicable to the circuitry configuration of an undervoltage release. Such a release can include, for example, an electromagnet for tripping a switching device, when the voltage of the power e supply system falls below a predetermined magnitude, and a driver circuit feeding the electromagnet, with the driver circuit having a rectifier circuit, an auxiliary voltage source, a pulse transmitter for producing a pulsed holding current for the electromagnet, and a threshold value circuit, which is provided with an undervoltage detector, for interrupting the holding current.

BACKGROUND OF THE INVENTION

In one known undervoltage release, the rectifier circuit is used to obtain a direct current, the auxiliary voltage source which is arranged downstream from the rectifier circuit is used for supplying voltage to the electronics, and the pulse transmitter is used for producing a holding current which, provided the power supply system voltage is sufficiently high, is essentially independent of this power supply system voltage. In this case, the pulse transmitter has an operational amplifier and an electronic switch which is controlled by the operational amplifier and is connected in series with a resistor in the holding circuit of the electromagnet, which is connected to a freewheeling diode. Furthermore, the pulse transmitter contains a feedback path to allow the voltage which is dropped across the resistor to act on the input of the operational amplifier (U.S. Pat. No. 4,788,621 A, DE 195 07 936 A1). It is also known for an undervoltage release such as this to be combined with an overcurrent release, with the overcurrent detector acting optoelectronically on a further electronic switch which is arranged in parallel with the electromagnet and the freewheeling diode and can short-circuit them (U.S. Pat. No. 4,890,184).

In the known undervoltage releases, the freewheeling diode which is arranged in parallel with the electromagnet is used itself to hold the electromagnet when the voltage briefly falls below a minimum level or in the event of brief interruptions. The tripping delay that occurs in this case is more than 100 ms. It is known for the tripping delay to be increased by using a capacitor and by a parallel arrangement comprising a series circuit of a resistor and a further electronic switch for the resistor that is connected in series with the electromagnet (DE 195 07 936 A1).

However, sometimes it is also desirable to ensure that the electromagnet trips in as short a time as possible (less than 100 ms) when the voltage briefly falls below a minimum voltage or in the event of brief voltage interruptions.

SUMMARY OF THE INVENTION

An object of an embodiment of the invention is to provide a circuit arrangement which is suitable.

In order to achieve an object, an embodiment of the invention provides for a further electronic switch which can be driven as a function of the output signal from the undervoltage detector and which is arranged between the electromagnet and the first-mentioned electronic switch, to be arranged in the self-holding circuit which is formed from the electromagnet and the freewheeling diode. Further, a timer may be provided for driving the further electronic switch, one pole of which timer is coupled to the auxiliary voltage source via a diode circuit.

The use of a timer for driving the second electronic switch is advantageous in comparison to the possible use of an optocoupler to drive it. The further electronic switch can expediently also be short-circuited via a link in order to make it possible to operate the undervoltage release with the "normal" tripping delay, as well.

The refinement of the circuit arrangement provided according to an embodiment of the invention allows an additional electronic switch to be activated by mechanically releasing a short-circuiting link, with this additional electronic switch being located in the same circuit as the freewheeling diode and thus being able to interrupt the self-holding circuit of the electromagnet with a delay of less than 100 ms.

It is known per se from EP 0 203 366 A1 for two switching elements which are optionally in the form of electronic switches, to be provided for a control apparatus for electromagnetic switching devices, which switching elements are located in the circuit of an operating coil. One of these switching elements allows a freewheeling diode to be rendered ineffective in order, when required, to cause the current in the operating coil to decay more quickly. In this case, and in contrast to the invention, the primary factor is not measured monitoring of a power supply system voltage, but the protection of the switching device by influencing its own magnet drive. The known control apparatus therefore cannot be used as an undervoltage release. In addition to this, there are no details, corresponding to the invention, relating to the connection of a timer for controlling the switching element located in the self-holding circuit of the operating coil.

BRIEF DESCRIPTION OF THE DRAWINGS

The FIGURE illustrates one exemplary embodiment of the circuit arrangement designed according to the invention.

DETAILED DESCRIPTION OF THE PREFERRED EMBODIMENTS

The voltage which is to be monitored by the undervoltage release is applied to the terminals K1 and K2. The terminals are followed by current-limiting resistors R1 and R2, a varistor V1 and a bridge circuit BS for rectifying the applied AC voltage and for providing a direct current for the winding (which can be connected to the terminals K5/K6) of an electromagnet (EM) for tripping a low-voltage circuit breaker, which is not shown in any more detail. The rectifier circuit BS is followed by an auxiliary voltage source HQ with a voltage divider comprising a resistor R3 and a voltage limiter Z1, as well as a smoothing A capacitor C1 and an energy storage capacitor C2. An integrated circuit containing the operational amplifiers OV1, OV2, OV3 and OV4 is supplied with power from the connecting point K4.

A resistor R4 and an electronic switch ES1 are connected in series with the winding of the electromagnet EM; a diode D1, which is referred to as a freewheeling diode, is arranged electrically in parallel with the winding of the electromagnet EM and a self-holding circuit for the electromagnet EM is closed via this diode D1, to be precise irrespective of whether or not any short-circuiting link KB which can be plugged onto the terminals K7/K8, is inserted. The electronic switch ES1 is part of a pulse transmitter for pulsing the holding current for the electromagnet, and can be controlled by the operational amplifier OV1, whose inputs 12 and 13 are supplied with reference and measurement voltages via the further operational amplifiers OV1, OV3 and OV4. The operational amplifier OV2, which is located in a feedback path, in this case receives its reference voltage at the input 10 from a reference voltage diode Z2 via the resistors R10/R11 and, possibly, in a pulsed manner from the output 2 of the operational amplifier OV3 via the capacitor C4; it receives its measurement voltage from the voltage drop across the resistor R4. The operational amplifier OV2 is followed by a diode D2 and a capacitor C3. The capacitor C3 provides a variable drive voltage for the input 12 of the operational amplifier OV1.

The operational amplifier OV3 acts as an undervoltage detector and is part of a threshold value circuit for interrupting the holding current, which holds the electromagnet in the pulled-in state. For this purpose, the input 5 of the operational amplifier OV3 is driven via a voltage divider R5/R6. A small reference voltage is defined at the input 4, via of the reference voltage diode Z2. The output of the operational amplifier OV3 is connected to the input 6 of the operational amplifier OV4; since the reference input 7 of the operational amplifier OV4 receives the same reference voltage as the reference input 4 of the operational amplifier OV3, the operational amplifier OV4 acts as an inverter for the operational amplifier OV3. The output 1 of the operational amplifier OV4 is coupled to the capacitor C3, and hence to the input 12 of the operational amplifier OV1.

A further electronic switch ES2 is arranged in series with the electronic switch ES1 in the holding circuit of the electromagnet EM and at the same time in the self-holding circuit that contains the freewheeling diode D1. This further electronic switch ES2 is driven by a timer comprising a resistor R7 and a capacitor C5 in conjunction with a zener diode Z3, with one pole of this timer being coupled to the auxiliary voltage source HQ via a diode circuit D3, D4, D5.

The further electronic switch ES2 is short-circuited when the contact link KB is inserted so that, if a brief undervoltage occurs at the terminals K1/K2, the self-holding circuit is activated with a tripping delay of more than 100 ms, via the freewheeling diode D1. When the contact link KB is withdrawn, the electronic switch ES2 is also included in the self-holding circuit and, when it is disconnected, immediately interrupts the current flow through the electromagnet EM.

Provided the input voltage between the terminals K1/K2 is sufficient, the output 2 of the operational amplifier OV3 changes to "high", as a result of which the output 1 of the inverter OV4 changes to "low". This allows the capacitor C3, which is connected to the output 12 of the operational amplifier OV1, to discharge itself; on reaching the voltage which is applied to the reference input 13 of the operational amplifier OV1, the output 15 of the operational amplifier OV1 jumps to "high", thus switching the electronic switch ES1 on. Since the input of the electronic switch ES2 is also "high" and, in consequence ES2, is switched on, a rising current starts to flow through the winding of the electromagnet EM.

The rising current produces an increasing voltage drop across the resistor R4. When this voltage drop becomes greater than the comparison voltage which is applied to the reference input 10 of the operational amplifier OV2 and which is input from the reference voltage diode Z2, the output 16 of the operational amplifier OV2 jumps to "high" so that the operational amplifier OV1 is reversed, and changes to "low" at the output 15. The electronic switch ES1 is thus switched off, and the electromagnet EM is held temporarily via the self-holding circuit.

Since the output 16 of the operational amplifier OV2 is "high", the capacitor C3 can also be charged. Once the electronic switch ES1 has switched off, the voltage drop across the resistor R4 changes to zero, and the output 16 of the operational amplifier OV2 changes to "low". In consequence, the capacitor C3 now discharges itself; as soon as the capacitor voltage falls below the reference voltage at the input 13 of the operational amplifier OV1, the output 15 of the operational amplifier OV1 jumps to "high", and the electronic switch ES1 is closed. The clock frequency of this switching process is approximately 1 kHz.

When, with the coupling link KB inserted, the voltage between the input terminals K1/K2 falls below the lower undervoltage value, the output of the operational amplifier OV3 switches to "low", the output of the inverter OV4 changes to "high", the output of OV1 At changes to "low", and the electronic switch ES1 is switched off. The winding of the electromagnet EM forces a decreasing current to flow via the diode D1 and, after approximately 100 to 200 μs, this decreasing current is no longer sufficient to hold the electromagnet.

When, with the coupling link KB withdrawn, the voltage between the input terminals K1/K2 falls below the lower undervoltage value, the electronic switch ES1 is likewise switched off. As long as ES1 was switched on, the capacitor C5 was being charged via the resistor R9 and the diodes D5, D3 and thus switched the electronic switch ES2 on. If the electronic switch ES1 is now switched off, the capacitor C5 discharges itself via the resistor R7. As soon as the voltage across the capacitor C5 falls below the value that is required to drive the electronic switch ES2, the electronic switch ES2 switches off. The self-holding circuit via the diode D1 is thus interrupted, and the electromagnet trips. The switching delay is in this case approximately 50 to 60 ms.

Alternatively, the capacitor C5 can also be charged via the output 15 of the operational amplifier OV1. The electronic switch ES2 can also be driven optoelectronically, directly from the output of the operational amplifier OV3.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An undervoltage release for monitoring the voltage of a power supply system, comprising:

an electromagnet for tripping a switching device when the voltage of the power supply system falls below a predetermined magnitude; and a driver circuit feeding the electromagnet, the driver circuit including, a rectifier circuit for obtaining a direct current, an auxiliary voltage source arranged downstream from the rectifier circuit, for supplying voltage to electronics, a pulse transmitter for producing a holding current which, provided the power supply system voltage is sufficiently high, is essentially independent of the power supply system voltage, and a threshold value circuit, provided with an undervoltage detector, for interrupting the holding current which holds the electromagnet in the pulled-in state, wherein the pulse transmitter includes, an operational amplifier, a first electronic switch, controlled by the operational amplifier and connected in series with a resistor in the holding circuit of the electromagnet, which is connected to a freewheeling diode, and with a feedback path to allow the voltage which is dropped across the resistor to act on the input of the operational amplifier, and wherein a self-holding circuit, which is formed from the electromagnet and the freewheeling diode, contains a further electronic switch which is driveable as a function of the output signal from the undervoltage detector and which is arranged between the electromagnet and the first electronic switch, and wherein a timer is provided for driving the further electronic switch, with one of its poles being coupled to the auxiliary voltage source via a diode circuit.

2. The undervoltage release as claimed in claim 1, wherein the further electronic switch can be short-circuited via a link.

3. An undervoltage release for monitoring the voltage of a power supply system, comprising:

an electromagnet for tripping a switching device; and a driver-circuit feeding the electromagnet, the driver circuit being adapted to produce a pulsed holding current for the electromagnet and including a first electronic switch connected to a free-wheeling diode and including a threshold value circuit, provided with an undervoltage detector, for interrupting the holding current which holds the electromagnet in the pulled-in state, and wherein a self-holding circuit, formed from the electromagnet and the freewheeling diode, contains a further electronic switch which is driveable as a function of the output signal from the undervoltage detector and which is arranged between the electromagnet and the first electronic switch, and wherein a timer is provided for driving the further electronic switch, with one of its poles being coupled to a auxiliary voltage source via a diode circuit.

4. The undervoltage release as claimed in claim 3, wherein further electronic switch can be short-circuited via a link.

5. The undervoltage release of claim 3, wherein the driver circuit further includes:

rectifier circuit for obtaining a direct current, an auxiliary voltage source arranged downstream from the rectifier circuit, for supplying voltage to electronics, and pulse transmitter for producing a holding current which, provided the power supply system voltage is sufficiently high, is essentially independent of this power supply system voltage.

* * * * *